(12) United States Patent
Baek et al.

(10) Patent No.: US 6,940,578 B2
(45) Date of Patent: Sep. 6, 2005

(54) METHOD FOR FABRICATING LIQUID CRYSTAL DISPLAY DEVICE

(75) Inventors: Myoung-Kee Baek, Gyeonggi-Do (KR); Kwon-Shik Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 44 days.

(21) Appl. No.: 10/674,508

(22) Filed: Oct. 1, 2003

(65) Prior Publication Data

US 2004/0119935 A1 Jun. 24, 2004

(30) Foreign Application Priority Data

Dec. 18, 2002 (KR) .................. 10-2002-0081440

(51) Int. Cl.[7] .................. G02F 1/13; G02F 1/1333; C30B 33/00; H01L 21/461
(52) U.S. Cl. .................. 349/187; 349/158; 216/23; 438/778
(58) Field of Search .................. 349/138, 158, 349/187; 141/150; 216/23; 438/689, 694, 725, 778

(56) References Cited

U.S. PATENT DOCUMENTS

| | | | |
|---|---|---|---|
| 4,294,650 A | 10/1981 | Werthmann .................. 216/54 |
| 5,259,926 A | 11/1993 | Kuwabara et al. .................. 216/54 |
| 5,514,503 A | 5/1996 | Evans et al. .................. 430/7 |
| 5,527,663 A * | 6/1996 | Togawa et al. .................. 430/320 |
| 5,544,582 A | 8/1996 | Bocko et al. .................. 101/211 |
| 5,678,483 A | 10/1997 | Johnson .................. 101/153 |
| 5,701,815 A | 12/1997 | Bocko et al. .................. 101/211 |
| 6,001,515 A | 12/1999 | Evans et al. .................. 430/7 |
| 6,233,031 B1 * | 5/2001 | Ishitaka .................. 349/113 |
| 6,356,318 B1 | 3/2002 | Kawahata .................. 349/38 |
| 6,759,348 B1 * | 7/2004 | Cho et al. .................. 438/778 |
| 2003/0124866 A1 * | 7/2003 | Kim et al. .................. 438/694 |
| 2004/0125249 A1 * | 7/2004 | Cho et al. .................. 349/43 |

FOREIGN PATENT DOCUMENTS

| | | |
|---|---|---|
| EP | 0 471 628 A1 | 2/1992 |
| JP | 63-205608 | 8/1988 |
| JP | 3-280416 | 12/1991 |
| JP | 4-94115 | 3/1992 |
| JP | 4-239684 | 8/1992 |
| JP | 4-249189 | 9/1992 |
| JP | 4-296724 | 10/1992 |
| JP | 5-11270 | 1/1993 |
| JP | 6-202314 | 7/1994 |
| JP | 7-240523 | 9/1995 |

* cited by examiner

*Primary Examiner*—Tarifur R. Chowdhury
(74) *Attorney, Agent, or Firm*—McKenna Long & Aldridge LLP

(57) ABSTRACT

A method of fabricating a liquid crystal display device includes providing a cliché having a plurality of grooves, each of the grooves having different depths and widths, filling resist material into the plurality of grooves, transferring the resist filled in the grooves onto a printing roll to form a plurality of resist portions along a circumference of the printing roll, and applying the resist portions onto a surface of an etching layer, wherein the applied resist portions form a resist pattern along the surface of the etching layer.

17 Claims, 10 Drawing Sheets

METHOD FOR FABRICATING LIQUID CRYSTAL DISPLAY DEVICE

The present invention claims the benefit of Korean Patent Application No. 81440/2002 filed in Korea on Dec. 18, 2002, which is hereby incorporated by reference.

BACKGROUND OF THE INVENTION

1. Field of the Invention

The present invention relates to fabrication of a display device, and particularly, to a method of fabricating a liquid crystal display device.

2. Description of the Related Art

Cathode ray tube (CRT) monitors have been commonly used for displaying information in television and computer systems. The CRT monitors produce high quality images and have relatively high brightness. However, as sizes of image display screens increase, depths of the CRT monitors have increased, thereby occupying a very large volume. In addition, weight of the CRT monitors have been problematic for use in portable display devices. In order to address these problems, flat panel display devices, such as liquid crystal display (LCD) devices, plasma display panel (PDP) devices, organic electro-luminescence display (OELD) devices, light emitting diode (LED) devices, and field emission display (FED) devices, have been substituted for the CRT monitors. Among these various flat panel display devices, the liquid crystal display (LCD) devices are commonly used in notebook and desktop computers because of their low power consumption.

FIG. 1 is a cross sectional view of liquid crystal display (LCD) device according to the related art. In FIG. 1, an LCD device includes a lower substrate 10, an upper substrate 20, and a liquid crystal material layer 15 formed in between the upper and lower substrates 10 and 20.

In addition, a thin film transistor T and a pixel electrode 7 are formed on the lower substrate 10, wherein the thin film transistor T includes a gate electrode 1 to which a scan signal is supplied, a semiconductor layer 3 for transmitting a data signal corresponding to the scan signal, a gate insulating layer 2 for electrically isolating the semiconductor layer 3 and the gate electrode 1, a source electrode 4 formed on an upper part of the semiconductor layer 3 for supplying the data signal, and a drain electrode 5 for supplying the data signal to the pixel electrode 7. The semiconductor layer 3 comprises an active layer 3a formed by depositing amorphous silicon (a—Si) and an n+ doped ohmic contact layer 3b on both upper sides of the active layer 3a. A passivation layer 6 and the pixel electrode 7 are formed on the thin film transistor T, and a first alignment layer 4a is formed on an upper part of the pixel electrode 7 for aligning liquid crystal molecules of the liquid crystal material layer 15. The pixel electrode 7 is made of a transparent conductor, such as indium tin oxide (ITO) or indium zinc oxide (IZO), so that light can be transmitted through the pixel electrode 7.

In FIG. 1, a black matrix 12 is formed on the upper substrate 20 for preventing the light from leaking between adjacent pixels, and color filters 11 of red (R), green (G), and blue (B) are formed on the black matrix 12 in order to produce colored light. In addition, a flattening layer (not shown) can be formed on the color filter 11 for flattening the color filters 11 and for improving adhesive bonding to a common electrode 13 that is subsequently formed on the color filters 11. A second alignment layer 4b is formed on the common electrode 13 for aligning the liquid crystal molecules of the liquid crystal material layer 15. A transparent conductor, such as ITO or IZO, is used as the common electrode 13 so that the light can be transmitted through the common electrode 13.

To fabricate the LCD device, several thin film deposition and photolithographic processes should be performed. For example, to fabricate the thin film transistor T, the color filters 11, and the black matrix 12, a photoresist pattern is formed by applying photoresist material. Then, the photoresist material undergoes exposure and strip processes using a mask, and an etching process is performed using the photoresist pattern as a mask. Accordingly, the process for forming the photoresist material includes rather complex fabrication processes and is not suitable for large area display devices. Thus, a printing method is used to pattern the photoresist material without the need for the exposure process.

FIGS. 2A to 2C are cross sectional views of a printing process according to the related art. In FIG. 2A, a cliché 24 having concave grooves 23 formed at a position corresponding to a desired pattern to be formed on a substrate is prepared, wherein a resist material 31 is deposited. Then, a doctor blade 32 is moved across a surface of the cliché 24 to deposit the resist material 31 into the concave grooves 23.

In FIG. 2B, the resist material 31 filled within the concave grooves 23 of the cliché 24 is transferred as a plurality of resist portions 31 onto a surface of a printing roll 33 as the printing roll 33 contacts the surface of the cliché 24. The printing roll 33 is formed to have the same width as a substrate 30 (in FIG. 2C) onto which the resist portions 31 subsequently will be applied. In addition, a circumference of the printing roll 33 is formed to have the same length of the substrate 30 (in FIG. 2C).

In FIG. 2C, the resist portions 31 are transferred from the printing roll 33 onto a surface of the substrate 30 as the printing roll 33 is rotated. Although not shown, the substrate 30 may include an etching object layer, wherein the resist portions 31 actually contact the etching object layer. Then, the resist portions 31 are irradiated with ultraviolet (UV) light, or the resist portions 31 are dried using heat to form a resist pattern 31. Accordingly, since a depth of the resist portions 31 formed on the cliché 24 are all the same, the resist pattern 31 may have various defects that only correspond to a width of the resist pattern 31

For example, when spacing between adjacent resist portions 31 is relatively narrow, the resist pattern 31 may include openings, as shown in FIG. 3, wherein a hole 40 may be generated at an end of the resist pattern 31, or a thickness of a center portion of the resist pattern 31 may become thinner than a thickness of an edge portion of the resist pattern 31. Accordingly, the spacings between the adjacent resist portions 31 and the thicknesses of the center and edge portions of the resist pattern 31 may vary due to differences in pressure between the printing roll 33 and the substrate 30 when the resist portions 31 are transferred from the cliché 24 onto the substrate 30. Thus, the defects of the resist pattern 31 cause electrical short circuits or electrical open circuits between the etching object layer (not shown), which is subsequently etched using the resist pattern 31 as a mask, thereby deteriorating image quality.

SUMMARY OF THE INVENTION

Accordingly, the present invention is directed to a method of fabricating a liquid crystal display device that substantially obviates one or more of the problems due to limitations and disadvantages of the related art.

An object of the present invention is to provide a method for a liquid crystal display device that includes forming a resist pattern.

Additional features and advantages of the invention will be set forth in the description which follows, and in part will be apparent from the description, or may be learned by practice of the invention. The objectives and other advantages of the invention will be realized and attained by the method particularly pointed out in the written description and claims hereof as well as the appended drawings.

To achieve these and other advantages and in accordance with the purpose of the present invention, as embodied and broadly described, a method of fabricating a liquid crystal display device includes providing a cliché having a plurality of grooves, each of the grooves having different depths and widths, filling resist material into the plurality of grooves, transferring the resist filled in the grooves onto a printing roll to form a plurality of resist portions along a circumference of the printing roll, and applying the resist portions onto a surface of an etching layer, wherein the applied resist portions form a resist pattern along the surface of etching layer.

In another aspect, a method for fabricating a liquid crystal display (LCD) device includes preparing one of a glass and plastic substrate, forming a plurality of grooves in the substrate, each of the grooves having different depths and widths, filling resist material into the plurality of grooves, transferring the resist material filled in the plurality of grooves onto a printing roll to form a plurality of resist portions, applying the plurality of resist portions onto an etching object layer to form a resist pattern, and etching the etching object layer using the resist pattern as a mask.

In another aspect, a method for fabricating a liquid crystal display (LCD) device includes preparing one of a glass and plastic substrate, depositing an organic layer onto the substrate, forming a plurality of grooves through a surface of the organic layer, each of the grooves having different depths and widths, depositing resist material on the surface and plurality of grooves of the organic layer, removing portions of the resist material deposited on the surface of the organic layer using a blade, transferring the resist material filled in the grooves onto a printing roll to form a plurality of resist portions, and applying the resist portions formed on the printing roll onto an etching object layer.

In another aspect, a method for fabricating a liquid crystal display (LCD) device includes providing a first substrate, forming a plurality of first grooves through a surface of the first substrate, each first groove having a first depth and a first width, forming a plurality of second grooves through the surface of the first substrate, each second groove having a second depth smaller than the first depth and a second width larger than the first width, filling resist material into the plurality of first and second grooves, attaching an etching object substrate onto the surface of the first substrate, applying at least one of heat and pressure to the etching object substrate, and applying the resist material filled in the first and second grooves onto the etching object substrate by separating the etching object substrate from the first substrate to form a resist pattern on the etching object substrate having a plurality of first portions corresponding to the plurality of first grooves and a plurality of second resist portions corresponding to the plurality of second grooves, wherein a first thickness of the first resist portions is larger than a second thickness of the second resist portions.

It is to be understood that both the foregoing general description and the following detailed description are exemplary and explanatory and are intended to provide further understanding of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
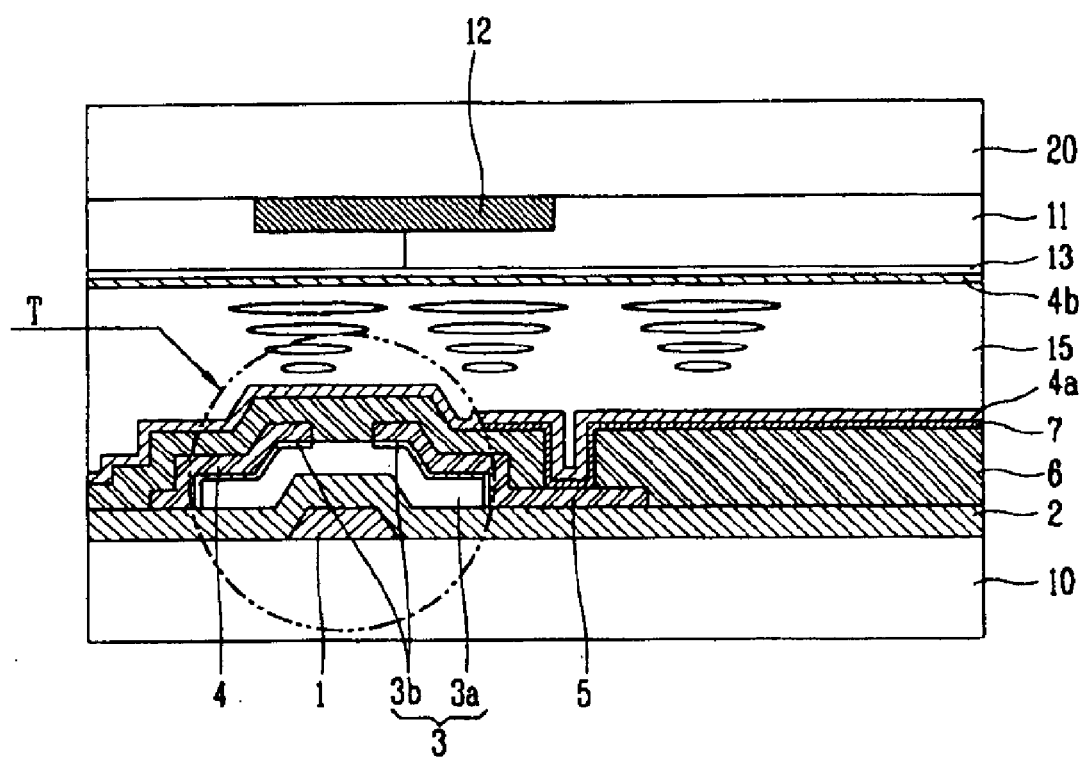
FIG. 1 is a cross sectional view of liquid crystal display (LCD) device according to the related art.
Figure 2A:
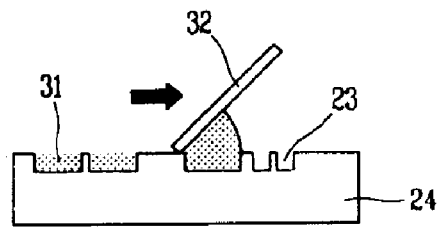
FIGS. 2A to 2C are cross sectional views of a printing process according to the related art.
Figure 2B:
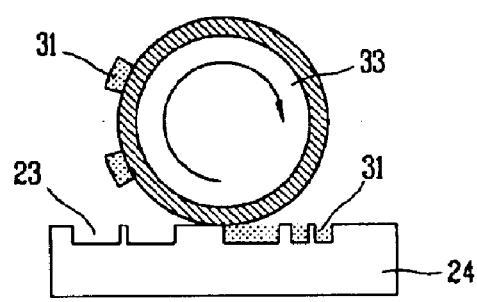
Figure 2C:
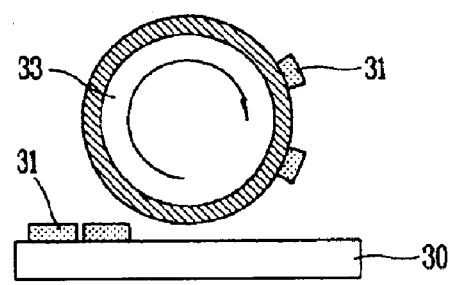
Figure 3:
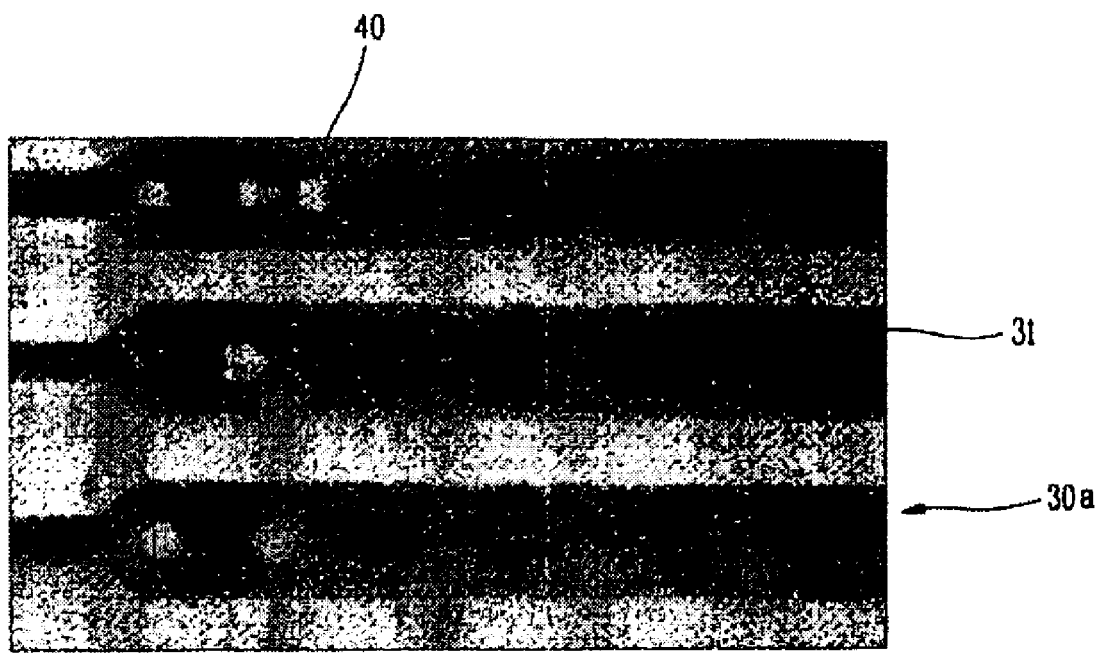
FIG. 3 is a photomicrograph of a resist pattern according to the related art.
Figure 4A:
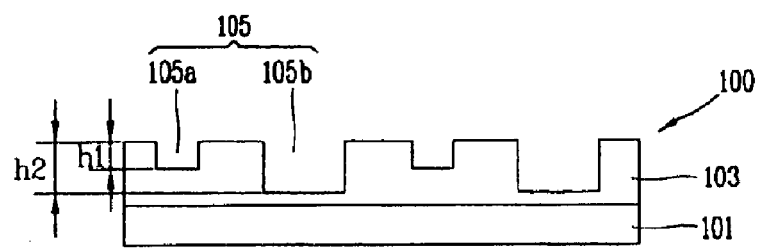
FIGS. 4A to 4E are cross sectional views of an exemplary method of fabricating an LCD device according to the present invention.

FIGS. 4A to 4E are cross sectional views of an exemplary method of fabricating an LCD device according to the present invention. In FIG. 4A, a buffer layer 103, such as a metal, organic material, or silicon, may be applied onto a substrate 101. Then, a plurality of grooves 105 having different depths may be formed on the buffer layer 103 using photolithographic processes, thereby forming a cliché 100. Accordingly, the depths of the grooves vary in accordance with corresponding widths of desired resist patterns. Thus, the wider the line width of the desired resist pattern, the deeper the grooves are formed in the buffer layer 103. In FIGS. 4A to 4E, although only two grooves 105a and 105b are shown to have different depths, a plurality of grooves, each having different depths, may be formed in the buffer layer 103.

Figure 4B:
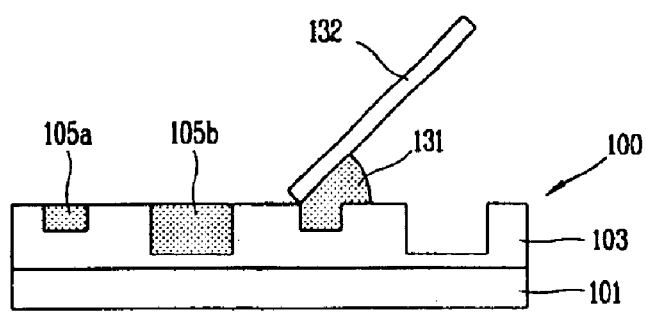

In FIG. 4B, a resist 131 may be applied onto the cliché 100, thereby filing the grooves 105. In addition, any remaining resist 131 may be removed by running a doctor blade 132 against the cliché 100. Accordingly, viscosity of the resist 131 may be selected in accordance with the desired resist pattern.

Figure 4C:
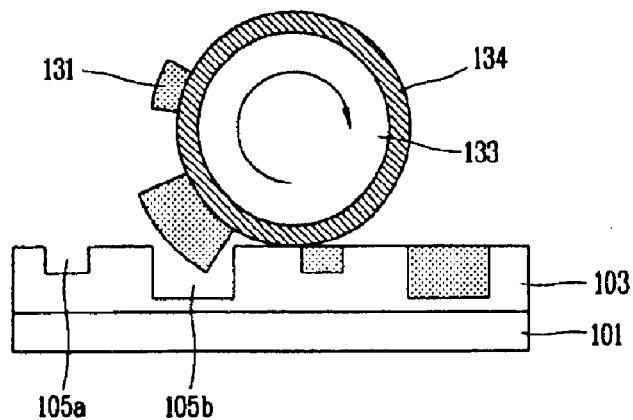

In FIG. 4C, the resist 131 filled in the grooves 105 of the cliché 100 may be transferred from the cliché 100 onto a blanket 134 of a printing roll 133, wherein the resist 131 may form a plurality of resist portions 131 distributed along a circumference of the printing roll 133. The blanket 134 of the printing roll 133 may improve adhesion between the plurality of resist portions 131 and the printing roll 133. The printing roll 133 may be formed to have a width approximately equal to a width of a display panel, and the circumference of the printing roll 133 may be approximately equal to a length of the display panel.

In FIG. 4C, the buffer layer 103 may assist removal of the resist 131 from the grooves 105 of the cliché 100. In addition, the buffer layer 103 may provide protection of the cliché 100 from any impact by the printing roll 133. Accordingly, since adhesion of the resist 131 with the buffer layer 103 is weaker than adhesion of the buffer layer 103 with the substrate 101, the resist 131 may be easily removed from the grooves 105 of the buffer layer 103 without separating the buffer layer 103 from the substrate 101.

Alternatively, the grooves 105 may be formed by etching the substrate 101 without forming the buffer layer 103 on the substrate 101. However, cracks may be generated on lower portions of the substrate 101 due to the impact of the printing roll 133 with the substrate 101. Thus, the buffer layer 103 may absorb the impact of the printing roll 133 to protect the substrate 101.

In addition, the resist 133 may be easily separated from the cliché 100 by making use of adhesion property changes of the resist 133 according to differences in temperature. For example, when the resist 133 has improved adhesion properties at elevated temperatures, the resist 133 may be easily separated from the cliché 100 when the temperature of the printing roll 133 is elevated by using heaters built into the cliché 100 and/or the printing roll 133. Moreover, when the resist 133 has improved adhesion properties at reduced temperatures, the resist 133 may be easily separated from the cliché 100 by setting a temperature of the printing roll 133 to be lower than a temperature of the cliché 100.

Figure 4D:
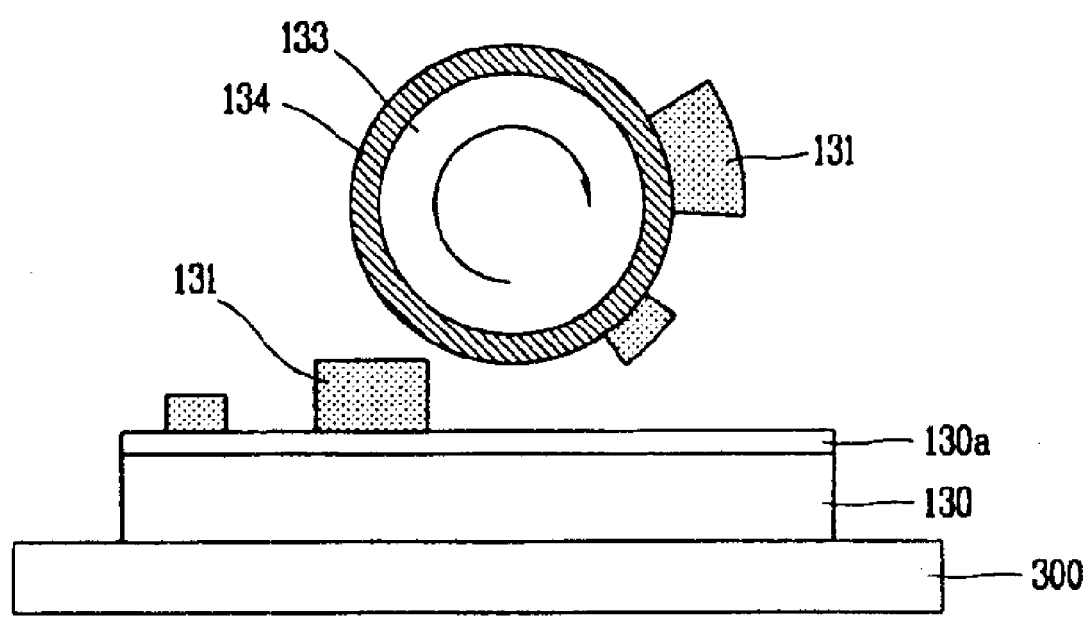

In FIG. 4D, after transferring the resist 131 filled in the grooves 105 of the cliché 100 onto the printing roll 133, which forms a plurality of resist portions 131 onto the blanket 134, the printing roll may rotate in order to transfer the plurality of resist portions 131 onto a surface of an etching object layer 130a formed on a substrate 130, which may be disposed on a stage 300. Then, the plurality of resist portions 131 may be irradiated with ultraviolet (UV) light, or the plurality of resist portions 131 may be dried using heat in order to form a resist pattern 131a. The etching object layer 130a may include a metal layer for forming a metal pattern, such as a gate electrode and source and drain electrodes of a thin film transistor, a gate line, a data line, a pixel electrode, a storage electrode, and/or a semiconductor layer. Alternatively, the etching object layer 131 may include an insulation layer, such as SiOx or SiNx. In addition, the plurality of resist portions 131 may be transferred onto an entire surface of the etching object layer 130a in order to form a desired resist pattern by one time rotation of the printing roll 133.

Accordingly, the plurality of resist portions 131 may be easily separated from the printing roll 133 by controlling the temperature of substrate 130 using a heater installed in the stage 300, whereby the plurality of resist portions 131 may be attached easily onto the substrate 130.

Although not shown, heaters may be installed on the cliché 100, the printing roll 133, and/or on the stage 300, wherein heat produced by the heaters may be individually controlled in order to maintain uniform temperatures along entire areas of the cliché 100, the printing roll 133, and the stage 300.

Figure 4E:
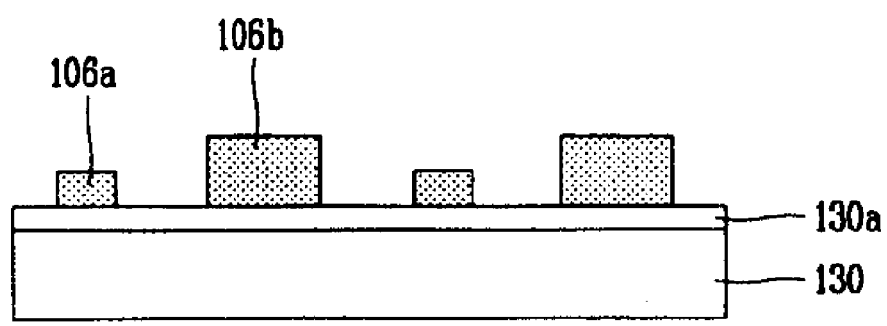

In FIG. 4E, the plurality of resist portions 131 may form the desired resist pattern on the etching object layer 130a of the substrate 130. Accordingly, the desired resist pattern may include first and second patterns 106a and 106b.

Next, after the desired resist pattern is formed on the etching object layer 130a, etching object layer 130a may be etched using an etching process, thereby forming a patterned metal layer (i.e., the gate line, the data line, and the electrode structures of the thin film transistor) or a patterned insulating layer (i.e., contact holes).

Figure 5A:
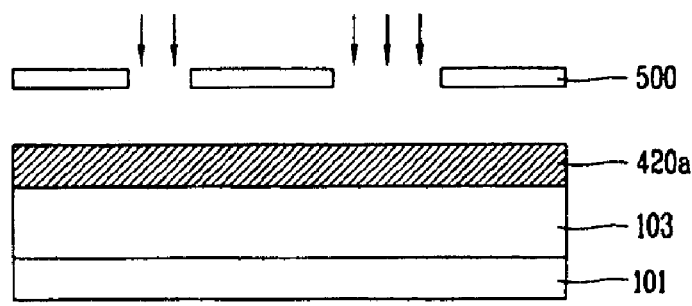
FIGS. 5A to 5E are cross sectional views of another exemplary method of fabricating an LCD according to the present invention.

FIGS. 5A to 5E are cross sectional views of another exemplary method of fabricating an LCD according to the present invention. In FIG. 5A, a buffer layer 103 may be formed on a substrate 101, such as glass or plastic, by depositing organic material, such as polymer or polyimide, or metal material, such as Ni. In addition, a first photoresist 420a may be evenly applied onto the buffer layer 103 using a coating process, such as spin coating or roll coating. Next, portions of the first photoresist film 420a may be blocked by a mask 500 upon which non-transparent regions may be selectively formed. Then, ultraviolet (UV) light (arrows) may be irradiated onto exposed portions of the first photoresist film 420a.

Figure 5B:
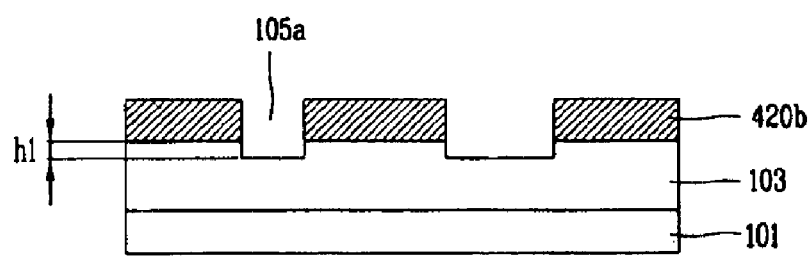

In FIG. 5B, the first photoresist film 420a may be developed to form a first photoresist pattern 420b that may selectively remain on the buffer layer 103. In addition, first grooves 105a having depths "h1" may be formed by dry etching the exposed portions of buffer layer 103, wherein the unexposed portions of the first photoresist pattern 420b may be removed. For example, the first grooves 105a may include a plurality of grooves having relatively wide and narrow widths. Then, the first photoresist pattern 420b may be removed.

Figure 5C:
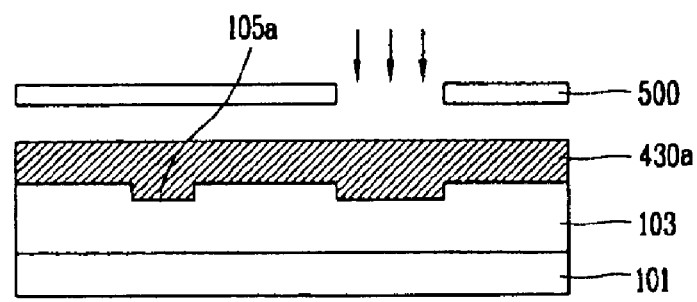

In FIG. 5C, a second photoresist film 430a may be applied onto an entire surface of the buffer layer 103 upon which the first grooves 105a are formed. In addition, portions of the second photoresist film 430a may be blocked using the mask 500, and ultraviolet (UV) light may be irradiated onto an exposed portion of the second photoresist film 430a.

Figure 5D:
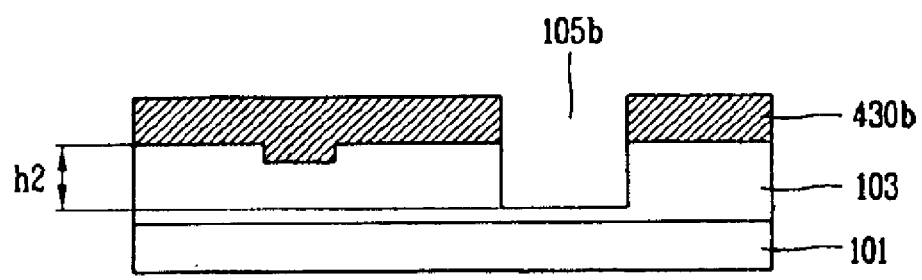

In FIG. 5D, a second photoresist pattern 430b may be formed to expose one of the first grooves 105a (in FIG. 5B) having a relatively large width. Then, an exposed portions of the buffer layer 103 may be etched using the second photoresist pattern 430b as a mask, thereby forming a second groove 105b having depth h2.

Figure 5E:
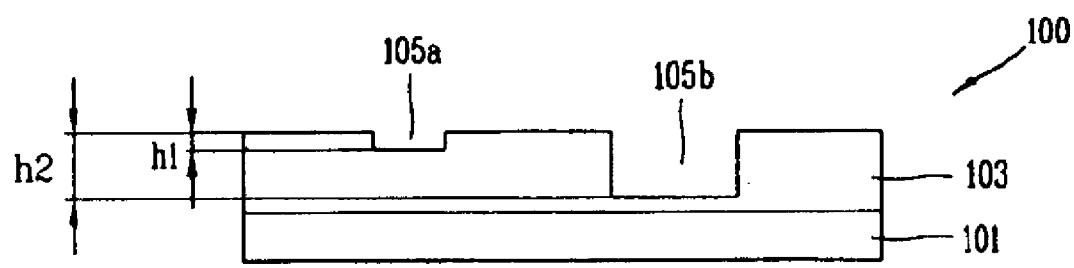

In FIG. 5E, the second photoresist pattern 430b may be removed to form a cliché 100 having a plurality of grooves 105a and 105b each having different depths and widths.

Figure 6A:
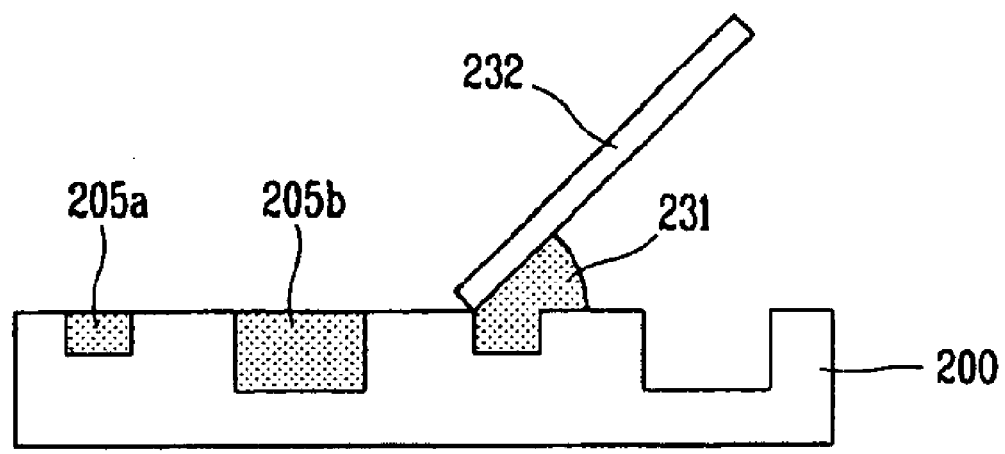
FIGS. 6A to 6D are cross sectional views of another exemplary method of fabricating an LCD according to the present invention.

FIGS. 6A to 6D are cross sectional views of another exemplary method of fabricating an LCD according to the present invention. In FIG. 6A, a resist 231 may be filled into a plurality of grooves 205a and 205b of a cliché 200, and a blade doctor 232 may be provided to remove excess amounts of resist 231 not filled in the plurality of grooves 205a and 205b. Accordingly, depths of the plurality of grooves 205a and 205b may correspond to desired line widths of subsequently formed patterns.

Figure 6B:
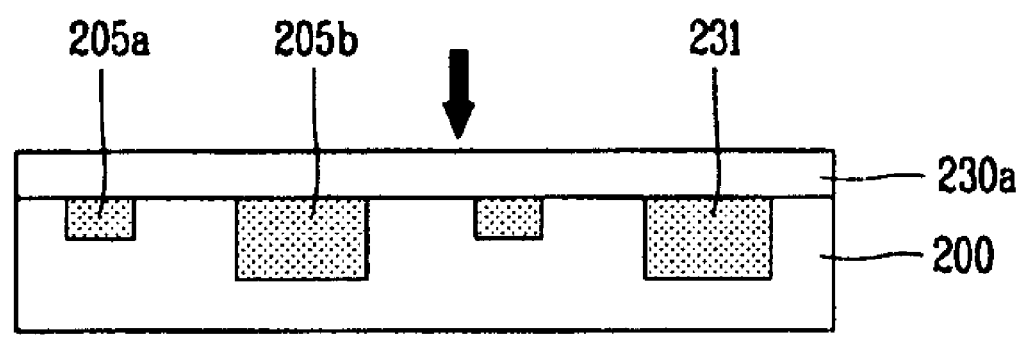

In FIG. 6B, an etching object layer 230a, which may be subsequently patterned, may be attached onto the cliché 200, and compressed and/or heated.

Figure 6C:
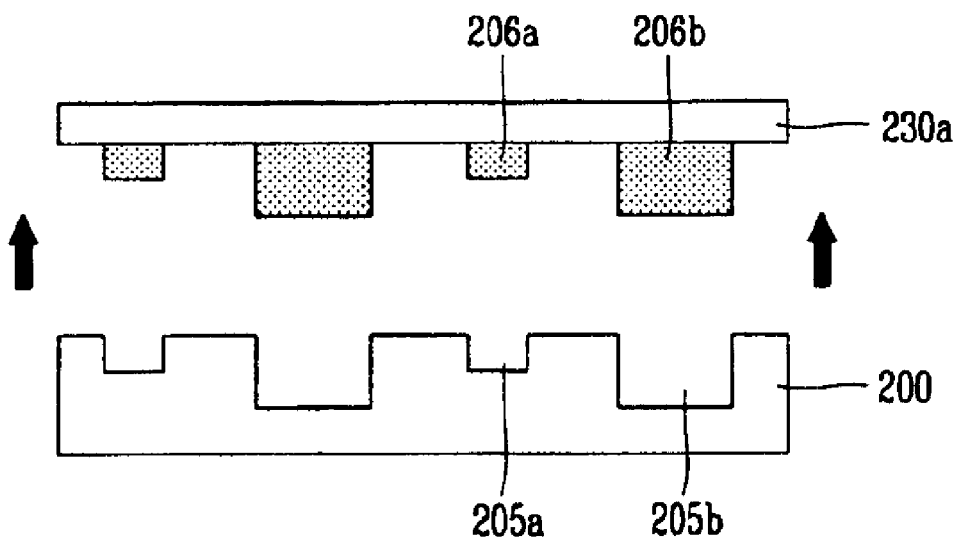
Figure 6D:
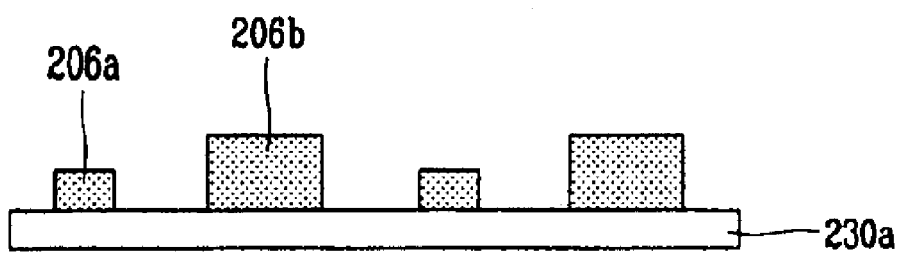

In FIGS. 6C and 6D, the etching object layer 230a may be separated from the cliché 200 in order to form a plurality of resist patterns 206a and 206b.

Figure 7:
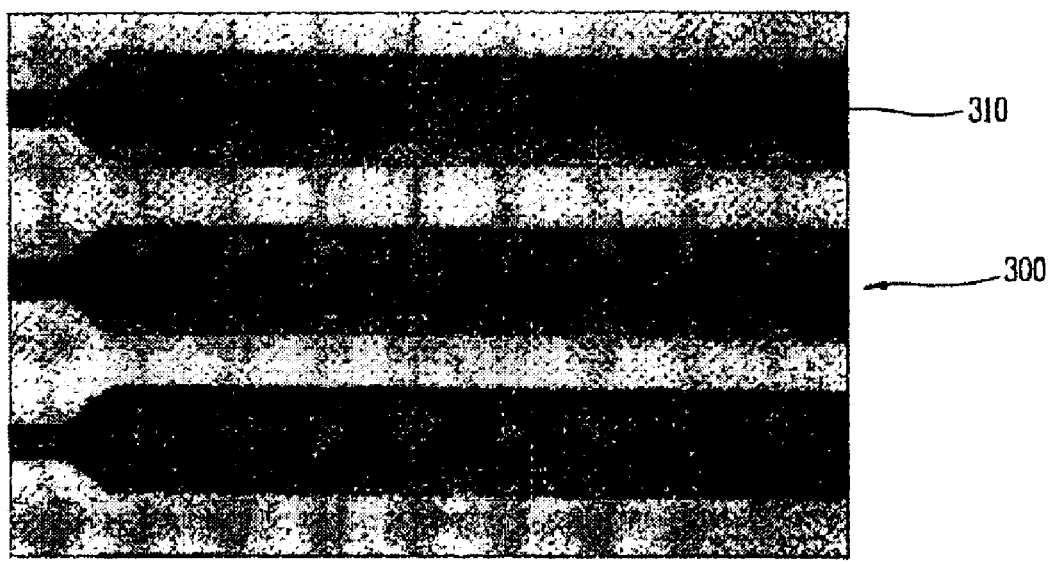
FIG. 7 is a photomicrograph of an exemplary resist pattern according to the present invention.

FIG. 7 is a photomicrograph of an exemplary resist pattern according to the present invention. In FIG. 7, a resist pattern 310 may be printed onto a substrate 300 such that no holes or openings may be formed in the resist pattern 310. Accordingly, defects of the resist pattern 310 may be prevented, thereby preventing electrical short circuiting or electrical open circuits.

It will be apparent to those skilled in the art that various modifications and variations can be made in the method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   providing a cliché having a plurality of grooves, each of the grooves having different depths and widths;
   filling resist material into the plurality of grooves;
   transferring the resist filled in the grooves onto a printing roll to form a plurality of resist portions along a circumference of the printing roll; and
   applying the resist portions onto a surface of an etching layer,
   wherein the applied resist portions form a resist pattern along the surface of the etching layer.

2. The method according to claim 1, wherein the plurality of grooves are formed in the cliché by at least two photolithographic processes.

3. The method according to claim 1, wherein the step of providing the cliché comprises:
   providing a substrate;
   depositing an organic layer onto a surface of the substrate;
   applying and patterning a first photoresist on the organic layer;
   forming at least one first groove in the organic layer by etching the organic layer using the first photoresist as a first mask;
   removing portions of the first photoresist;
   forming a second photoresist pattern on the organic layer and the at least one first groove;
   forming at least one second groove in the organic layer by etching the organic layer using the second photoresist pattern as a second mask; and
   removing portions of the second photoresist.

4. The method according to claim 3, wherein the organic layer includes at least one of polymers and polyimides.

5. The method according to claim 3, wherein the substrate includes at least one of glass and plastic.

6. The method according to claim 1, wherein the step of providing the cliché comprises:
   preparing a substrate;
   depositing a metal layer onto the substrate;
   forming a first photoresist on the metal layer;
   forming at least one first groove in the metal layer by etching the metal layer using the first photoresist pattern as a first mask;
   forming a second photoresist pattern on the metal layer and the at least one first groove;
   forming at least one second groove in the metal layer by etching the metal layer using the second photoresist pattern as a second mask; and
   removing portions of the second photoresist pattern.

7. The method according to claim 1, wherein the step of filling the resist material into the plurality of grooves of the cliché comprises:
   depositing the resist material onto a surface and the grooves of the cliché; and
   removing the resist material deposited on the surface of the cliché using a blade.

8. The method according to claim 1, wherein the etching object layer includes at least one of SiOx and SiNx.

9. The method according to claim 1, wherein the etching object layer includes at least a metal layer.

10. A method for fabricating a liquid crystal display (LCD) device, comprising:
    preparing one of a glass and plastic substrate;
    forming a plurality of grooves in the substrate, each of the grooves having different depths and widths;
    filling resist material into the plurality of grooves;
    transferring the resist material filled in the plurality of grooves onto a printing roll to form a plurality of resist portions;
    applying the plurality of resist portions onto an etching object layer to form a resist pattern; and
    etching the etching object layer using the resist pattern as a mask.

11. A method for fabricating a liquid crystal display (LCD) device, comprising:
    preparing one of a glass and plastic substrate;
    depositing an organic layer onto the substrate;
    forming a plurality of grooves through a surface of the organic layer, each of the grooves having different depths and widths;
    depositing resist material on the surface and plurality of grooves of the organic layer;
    removing portions of the resist material deposited on the surface of the organic layer using a blade;
    transferring the resist material filled in the grooves onto a printing roll to form a plurality of resist portions; and
    applying the resist portions formed on the printing roll onto an etching object layer.

12. A method for fabricating a liquid crystal display (LCD) device, comprising:
    providing a first substrate;
    forming a plurality of first grooves through a surface of the first substrate, each first groove having a first depth and a first width;
    forming a plurality of second grooves through the surface of the first substrate, each second groove having a second depth smaller than the first depth and a second width larger than the first width;
    filling resist material into the plurality of first and second grooves;
    attaching an etching object substrate onto the surface of the first substrate;
    applying at least one of heat and pressure to the etching object substrate; and
    applying the resist material filled in the first and second grooves onto the etching object substrate by separating the etching object substrate from the first substrate to form a resist pattern on the etching object substrate having a plurality of first portions corresponding to the plurality of first grooves and a plurality of second resist portions corresponding to the plurality of second grooves,
    wherein a first thickness of the first resist portions is larger than a second thickness of the second resist portions.

13. The method according to claim 12, wherein a first width of the first resist portions is smaller than a second width of the second resist portions.

14. The method according to claim 13, wherein the first thickness of the first resist portions is approximately equal to the first depth of the plurality of first grooves and the second thickness of the second resist portions is approximately equal to the second depth of the plurality of second grooves.

15. The method according to claim 12, wherein the step of filling the resist material comprises:
    depositing the resist material onto the surface and plurality of first and second grooves in the first substrate;
    removing the resist material deposited on the surface of the first substrate using a blade.

16. The method according to claim 12, wherein the etching object substrate includes at least one of SiOx and SiNx.

17. The method according to claim 12, wherein the etching object substrate includes at least a metal layer.

* * * * *